United States Patent
Wu

(10) Patent No.: US 12,376,173 B2
(45) Date of Patent: Jul. 29, 2025

(54) CONNECTION FAILURE PROCESSING METHOD, TERMINAL, AND NETWORK DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 480 days.

(21) Appl. No.: 17/730,137

(22) Filed: Apr. 26, 2022

(65) Prior Publication Data
US 2022/0256638 A1 Aug. 11, 2022

Related U.S. Application Data

(63) Continuation of application No. PCT/CN2020/126364, filed on Nov. 4, 2020.

(30) Foreign Application Priority Data

Nov. 6, 2019 (CN) .......................... 201911077189.3

(51) Int. Cl.
H04W 76/19 (2018.01)
H04W 36/18 (2009.01)
H04W 76/18 (2018.01)

(52) U.S. Cl.
CPC ......... *H04W 76/19* (2018.02); *H04W 36/185* (2023.05); *H04W 76/18* (2018.02)

(58) Field of Classification Search
CPC ... H04W 36/185; H04W 76/15; H04W 76/18; H04W 76/19; H04W 76/22; H04W 76/34
See application file for complete search history.

(56) References Cited

U.S. PATENT DOCUMENTS

| 2016/0044639 | A1 | 2/2016 | Yi et al. |
| 2017/0353992 | A1* | 12/2017 | Quan .................... H04W 76/34 |
| 2020/0314716 | A1* | 10/2020 | Kim ................... H04W 36/0079 |
| 2021/0136829 | A1* | 5/2021 | Kim ................... H04W 74/0833 |

FOREIGN PATENT DOCUMENTS

CN 106664631 A 5/2017

OTHER PUBLICATIONS

International Search Report issued in corresponding International Application No. PCT/CN2020/126364, mailed Feb. 3, 2021, 4 pages.
Qualcomm Incorporated, "Supporting per DRB DAPS HO configuration", 3GPP TSG-RAN WG2 Meeting #107bis R2-1912299, Oct. 18, 2019.

* cited by examiner

Primary Examiner — Mansour Oveissi
(74) Attorney, Agent, or Firm — IPX PLLC

(57) ABSTRACT

The present disclosure provides a connection failure processing method, a terminal, and a network device. The method includes: receiving a Dual Active Protocol Stack (DAPS) mobility configuration sent by a network device, where the DAPS mobility configuration includes a target Radio Bearer (RB) for which a DAPS function is not configured; and in a DAPS mobility process, in a case that a connection failure occurs, processing the target RB based on a state of the connection failure, where the state of the connection failure includes at least one occurrence of a connection failure of a source cell or occurrence of a connection failure of a target cell.

21 Claims, 4 Drawing Sheets

Receive a dual active protocol stack DAPS mobility configuration sent by a network device — 201

In a DAPS mobility process, in a case that a connection failure occurs, process the target RB based on a state of the connection failure — 202

CONNECTION FAILURE PROCESSING METHOD, TERMINAL, AND NETWORK DEVICE

CROSS-REFERENCE TO RELATED APPLICATIONS

This application is a continuation of International Application No. PCT/CN2020/126364, filed Nov. 4, 2020, which claims priority to Chinese Patent Application 201911077189.3, filed Nov. 6, 2019. The entire contents of each of the above-referenced applications are expressly incorporated herein by reference.

TECHNICAL FIELD

The present disclosure relates to the field of communications technologies, and in particular, to a connection failure processing method, a terminal, and a network device.

BACKGROUND

A Dual Active Protocol Stack (DAPS) mobility process is generally configured in a wireless communications system. In the DAPS mobility process, a terminal may simultaneously establish a connection to a source cell and a connection to a target cell. In the prior art, when a network device configures a DAPS mobility process, a part of Radio Bearer (RB) may be configured in the DAPS mobility configuration to simultaneously establish the connection to the source cell and the connection to the target cell (that is, may be referred to as RBs for which a DAPS function is configured), and a part of RBs only need to establish the connection to the target cell (that is, may be referred to as RBs for which the DAPS function is not configured).

In the DAPS mobility process, a connection failure may occur on the terminal, and the connection failure may include the following several types:
1. a handover failure (for example, a handover fails within a specified time (for example, timer t304 timeout));
2. a Secondary Cell Group (SCG) change failure (for example, access of a new SCG is not completed within a specified time (for example, timer t307 timeout)); and
3. a Radio Link Failure (RLF).

The radio link failure includes the following several types:
out of synchronization at a physical layer (for example, timer t310 timeout);
a random access failure at a Medium Access Control (MAC) layer (for example, a maximum quantity of random access attempts is reached);
an indication of a maximum quantity of retransmission times at a Radio Link Control (RLC) layer (for example, the maximum quantity of retransmission times at the RLC layer is reached);
a beam failure (for example, a beam recovery process failure); and
an uplink Listen-Before-Talk (LBT) failure (for example, a sending failure because uplink sending cannot be continuously performed on an unlicensed band due to frequency congestion).

Currently, in the DAPS mobility process, it is not clear how to process an RB for which the DAPS function is not configured in a case that the connection failure occurs on the terminal.

SUMMARY

Embodiments of the present disclosure provide a connection failure processing method, a terminal, and a network device, to resolve a problem of how to process a target RB.

According to a first aspect, an embodiment of the present disclosure provides a connection failure processing method, applied to a terminal and including:
receiving a dual active protocol stack DAPS mobility configuration sent by a network device, where the DAPS mobility configuration includes a target radio bearer RB for which a DAPS function is not configured; and
in a DAPS mobility process, in a case that a connection failure occurs, processing the target RB based on a state of the connection failure, where
the state of the connection failure includes at least one of occurrence of a connection failure of a source cell and occurrence of a connection failure of a target cell.

According to a second aspect, an embodiment of the present disclosure further provides a connection failure processing method, applied to a network device, where the network device is a source access device that performs a DAPS mobility process with a terminal, and the method includes:
sending a dual active protocol stack DAPS mobility configuration to the terminal, where the DAPS mobility configuration includes a target radio bearer RB for which a DAPS function is not configured; the DAPS mobility configuration is used by the terminal to perform the DAPS mobility process, and in the DAPS mobility process, in a case that a connection failure occurs, process the target RB based on a state of the connection failure; and the state of the connection failure includes at least one of occurrence of a connection failure of a source cell and occurrence of a connection failure of a target cell.

According to a third aspect, an embodiment of the present disclosure further provides a terminal, including:
a receiving module, configured to receive a dual active protocol stack DAPS mobility configuration sent by a network device, where the DAPS mobility configuration includes a target radio bearer RB for which a DAPS function is not configured; and
a processing module, configured to: in a DAPS mobility process, in a case that a connection failure occurs, process the target RB based on a state of the connection failure, where
the state of the connection failure includes at least one of occurrence of a connection failure of a source cell and occurrence of a connection failure of a target cell.

According to a fourth aspect, an embodiment of the present disclosure further provides a network device, where the network device is a source access device that performs a DAPS mobility process with a terminal, and the network device includes:
a sending module, configured to send a dual active protocol stack DAPS mobility configuration to the terminal, where the DAPS mobility configuration includes a target radio bearer RB for which a DAPS function is not configured; the DAPS mobility configuration is used by the terminal to perform the DAPS mobility process, and in the DAPS mobility process, in a case that a connection failure occurs, process the target RB based on a state of the connection failure; and the state of the connection failure includes at least one of occurrence of a connection failure of a source cell and occurrence of a connection failure of a target cell.

According to a fifth aspect, an embodiment of the present disclosure further provides a terminal, including a memory, a processor, and a program that is stored in the memory and that can be run on the processor, where when the program is executed by the processor, the steps of the connection failure processing method on the terminal side are implemented.

According to a sixth aspect, an embodiment of the present disclosure further provides a network device, including a memory, a processor, and a program that is stored in the memory and that can be run on the processor, where when the program is executed by the processor, the steps of the connection failure processing method on the network device side are implemented.

According to a seventh aspect, an embodiment of the present disclosure further provides a computer-readable storage medium, where the computer-readable storage medium stores a computer program, and when the computer program is executed by a processor, the steps of the connection failure processing method on the terminal side are implemented, or when the computer program is executed by a processor, the steps of the connection failure processing method on the network device side are implemented.

In the embodiments of the present disclosure, in a case that a connection failure occurs, a target RB for which a DAPS function is not configured is processed based on a state of the connection failure, thereby implementing processing on the target RB.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present disclosure, the word such as "example" is used to represent giving an example, an illustration, or a description. Any embodiment or design scheme described as an "example" in the embodiments of the present disclosure should not be explained as being more preferred or having more advantages than another embodiment or design scheme. Exactly, use of the term "example" or "for example" is intended to present a concept in a specific manner.

The embodiments of the present disclosure are described below with reference to the accompanying drawings. A connection failure processing method, a terminal, and a network device provided in the embodiments of the present disclosure may be applied to a wireless communications system. The wireless communications system may be a 5G system, or an Evolved Long Term Evolution (eLTE) system, or a subsequent evolved communications system.

Figure 1:
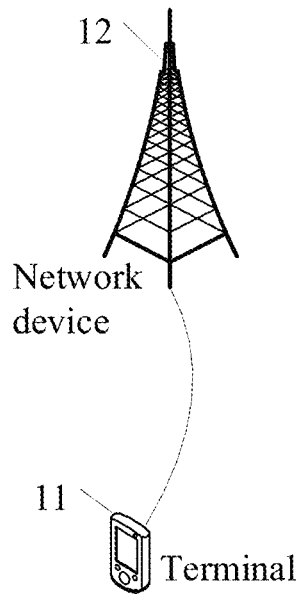
FIG. 1 is a structural diagram of a network system to which the embodiments of the present disclosure can be applied.

Referring to FIG. 1, FIG. 1 is a structural diagram of a network system to which the embodiments of the present disclosure can be applied. As shown in FIG. 1, the network system includes a terminal 11 and a network device 12. The terminal 11 may be a user terminal or another terminal side device, for example, a mobile phone, a tablet personal computer, a laptop computer, a personal digital assistant (PDA), a Mobile Internet Device (MID), or a wearable device. It should be noted that a specific type of the terminal 11 is not limited in the embodiments of the present disclosure. The network device 12 may be a 5G base station, or a base station of a later release, or a base station in another communications system, or may be referred to as a NodeB, an evolved NodeB, or a Transmission Reception Point (TRP), or an Access Point (AP), or another term in the field. Provided that a same technical effect is achieved, the network device is not limited to a specific technical term. In addition, the network device 12 may be a Master Node (MN) or a Secondary Node (SN). It should be noted that, in the embodiments of the present disclosure, only a 5G base station is used as an example, but a specific type of the network device is not limited.

Figure 2:
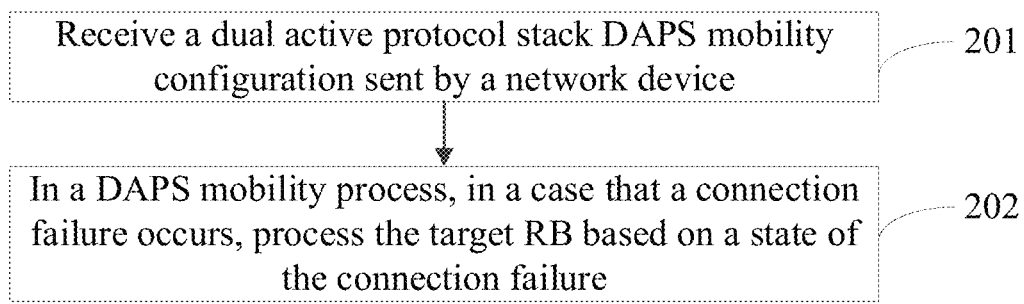
FIG. 2 is a flowchart of a connection failure processing method according to an embodiment of the present disclosure.

Referring to FIG. 2, FIG. 2 is a flowchart of a connection failure processing method according to an embodiment of the present disclosure. The method is applied to a terminal. As shown in FIG. 2, the method includes the following steps.

Step 201: Receive a dual active protocol stack DAPS mobility configuration sent by a network device, where the DAPS mobility configuration includes a target radio bearer RB for which a DAPS function is not configured.

Step 202: In a DAPS mobility process, in a case that a connection failure occurs, processing the target RB based on a state of the connection failure.

The state of the connection failure includes at least one of occurrence of a connection failure of a source cell and occurrence of a connection failure of a target cell.

In this embodiment of the present disclosure, the DAPS mobility configuration may include the target RB for which the DAPS function is not configured and an RB for which the DAPS function is configured. There is at least one target RB, that is, the DAPS mobility configuration includes one or more target RBs for which the DAPS function is not configured.

In addition, there may be two types of target RBs: a Data Radio Bearer (DRB) and a Signal Radio Bearer (SRB). If the DAPS mobility configuration includes only one target RB for which the DAPS function is not configured, the target RB may be a DRB or an SRB. If the DAPS mobility configuration includes a plurality of target RBs for which the DAPS function is not configured, a part of the target RBs may be a DRB, and a part of the target RBs may be an SRB, or all of the target RBs may be DRBs, or all of the target RBs may be SRBs.

It should be understood that the DAPS mobility configuration may be a handover configuration or an SCG change configuration.

In this embodiment of the present disclosure, there may be three types of the state of the connection failure. The first type is that the connection failure of the source cell occurs and the connection failure of the target cell does not occur. The second type is that the connection failure of the target cell occurs and the connection failure of the source cell does not occur. The third type is that the connection failure of the target cell occurs and the connection failure of the source cell also occurs.

That the connection failure of the target cell does not occur may be understood as that a connection to the target cell is still available. Correspondingly, that the connection failure of the target cell occurs may be understood as that the connection to the target cell is not available. That the connection failure of the source cell does not occur may be understood as that a connection to the source cell is still available. Correspondingly, that the connection failure of the source cell occurs may be understood as that the connection to the source cell is not available.

In an optional embodiment, a case that the connection failure of the target cell occurs may include at least one of the following:
  a handover failure (for example, a handover fails within a specified time (for example, timer t304 timeout));
  an SCG change failure (for example, access of a new SCG is not completed within a specified time (for example, timer t307 timeout)); and
  an RLF.

The RLF may include the following several cases:
  out of synchronization at a physical layer (for example, timer t310 timeout);
  a random access failure at a MAC layer (for example, a maximum quantity of random access attempts is reached);
  an indication of a maximum quantity of retransmission times at an RLC layer (for example, the maximum quantity of retransmission times at the RLC layer is reached);
  a beam failure (for example, a beam recovery process failure); and
  an LBT failure (for example, a sending failure because uplink sending cannot be continuously performed on an unlicensed band due to frequency congestion).

In an optional embodiment, a case that the connection failure of the source cell occurs may include at least one of the following:
  out of synchronization at a physical layer (for example, timer t310 timeout of a Primary Cell (PCell) connected to the source cell);
  a random access failure at a MAC layer (for example, a maximum quantity of random access attempts is reached at MAC connected to the source cell);
  an indication of a maximum quantity of retransmission times at an RLC layer (for example, the maximum quantity of retransmission times at the RLC layer is reached at RLC connected to the source cell);
  a beam failure (for example, a beam recovery process failure of the connection to the source cell); and
  an uplink LBT failure (for example, a sending failure because uplink sending cannot be continuously performed on an unlicensed band due to frequency congestion, where the connection to the source cell is the unlicensed band).

In the DAPS mobility process, in a case that the connection failure occurs, the target RB may be performed based on the state of the connection failure. For what processing is performed on the target RB, a specific processing behavior on the target RB may be preconfigured or stipulated in a protocol, which is described in detail in the following embodiments.

In this embodiment of the present disclosure, in a case that a connection failure occurs, a target RB for which a DAPS function is not configured is processed based on a state of the connection failure, thereby implementing processing on the target RB.

Further, in an optional embodiment, the processing the target RB based on a state of the connection failure includes one of the following:
  deleting the target RB in a case that the connection failure of the target cell occurs; and
  stopping or suspending a first operation of the target RB in a case that the connection failure of the target cell occurs, where the first operation includes data sending and/or receiving; or
  stopping or suspending a first operation of the target RB in a case that the connection failure of the target cell occurs and the connection failure of the source cell does not occur, where the first operation includes data sending and/or receiving; or
  establishing a connection between the target RB and the source cell in a case that the connection failure of the target cell occurs and the connection failure of the source cell does not occur, to resume a second operation of the target RB, where the second operation includes data sending and/or receiving; or
  maintaining data sending and/or receiving of the target RB in the target cell in a case that the connection failure of the source cell occurs and the connection failure of the target cell does not occur.

Specifically, in a case that the connection failure of the target cell occurs, the following processing behaviors may be performed based on a pre-configuration or a stipulation in a protocol.

Processing behavior 1: Delete the target RB. A condition for performing the processing behavior may include: the connection failure of the target cell occurs and the connection failure of the source cell does not occur; or the connection failure of the target cell occurs and the connection failure of the source cell also occurs. In other words, it can be understood that the processing behavior 1 may be performed as long as the connection failure of the target cell occurs.

Processing behavior 2: Stop or suspend the first operation of the target RB. A condition for performing the processing behavior 2 may include: the connection failure of the target cell occurs and the connection failure of the source cell does not occur; or the connection failure of the target cell occurs and the connection failure of the source cell also occurs. In a case that the connection failure of the target cell occurs, the stopping or suspending a first operation of the target RB may be understood as follows: the processing behavior 2 may be performed as long as the connection failure of the target cell occurs.

It should be noted that stopping a first operation of the target RBB may be understood as stopping data sending of the target RB, stopping data receiving of the target RB, or stopping data sending and receiving of the target RB. The suspending a first operation of the target RB may be understood as suspending the target RB. In other words, both data sending and receiving of the target RB are stopped.

For example, if the target RB is a DRB, the stopping or suspending a first operation of the target RB may include at least one of the following:

a Packet Data Convergence Protocol (PDCP) of the DRB stops sending data to RLC;
the PDCP of the DRB stops receiving data from RLC;
RLC of the DRB stops sending data to MAC; and
RLC of the DRB stops receiving data from MAC.

It should be noted that, that the PDCP of the DRB stops receiving data from RLC may include one of the following:

the PDCP of the DRB stops receiving the data from RLC; and
the PDCP of the DRB stops submitting the data from RLC to a higher layer.

That the PDCP of the DRB stops submitting the data from RLC to a higher layer may be understood as: although the PDCP of the DRB receives the data from RLC, but does not submit the received data to the higher layer (for example, a Service Discovery Application Profile (SDAP) or an Internet Protocol (IP)).

Processing behavior 3: Establish the connection between the target RB and the source cell, to resume the second operation of the target RB. A condition for performing the processing behavior 3 may be: the connection failure of the target cell occurs and the connection failure of the source cell does not occur.

Processing behavior 4: Maintain data sending and/or receiving of the target RB in the target cell. A condition for performing the processing behavior 4 may be: the connection failure of the source cell occurs and the connection failure of the target cell does not occur.

It should be understood that, in this embodiment, in a case that the connection failure of the target cell occurs, any one of the processing behaviors 1 to 3 may be performed, and a specific behavior may be stipulated in advance in a protocol. In a case that the connection failure of the source cell occurs and the connection failure of the target cell does not occur, the terminal may perform the processing behavior 4.

Further, in an optional embodiment, in the foregoing processing behavior 1, the target RB may be deleted by deleting an RLC entity and a PDCP entity corresponding to the target RB.

In some embodiments, before deleting an RLC entity corresponding to the target RB, the processing of the target RB based on a state of the connection failure further includes:

re-establishing the RLC entity corresponding to the target RB.

In this way, before the RLC entity corresponding to the target RB is deleted, the RLC entity corresponding to the target RB is re-established, and data in the RLC corresponding to the target RB may be retained, to prevent the data from being lost.

In some embodiments, before deleting a PDCP entity corresponding to the target RB, the processing of the target RB based on a state of the connection failure further includes:

re-establishing the PDCP entity corresponding to the target RB.

In this way, before the PDCP entity corresponding to the target RB is deleted, the PDCP entity corresponding to the target RB is re-established, and data in the PDCP corresponding to the target RB may be retained, to prevent the data from being lost.

Further, in an optional embodiment, the establishing a connection between the target RB and the source cell includes:

establishing the connection between the target RB and the source cell based on preset target configuration information or target configuration information stipulated in a protocol.

Further, in an optional embodiment, the target configuration information includes one of the following:

first configuration information for the target RB to establish the connection to the source cell before the DAPS mobility configuration is received or executed; and
second configuration information is carried in the DAPS mobility configuration, where the second configuration information is configuration information that is for the connection to the source cell and that is used to resume the second operation of the target RB.

For example, if the target RB is a DRB, the first configuration information may be configuration information of a source cell corresponding to the DRB (for example, includes configuration information of RLC and a PDCP of the source cell corresponding to the DRB) before the terminal receives or executes a handover command. The second configuration information may be configuration information that is for the connection to the source cell of the DRB used in a case that the connection failure of the target cell occurs and that is received by the terminal in a handover command in the DAPS mobility process (for example, includes configuration information of RLC and a PDCP of the source cell corresponding to the DRB).

Further, in an optional embodiment, in a case that the connection failure of the target cell occurs and the connection failure of the source cell does not occur, the processing the target RB based on a state of the connection failure further includes:

establishing or maintaining a connection between the target RB and the target cell.

Only the connection between the target RB and the source cell may be established in a case that the connection failure of the target cell occurs and the connection failure of the source cell does not occur, to resume the second operation of the target RB. For example, a PDCP and RLC of a DRB are configured to be connected to the source cell.

In a case that the connection failure of the target cell occurs and the connection failure of the source cell does not occur, the connection between the target RB and the target cell may be established or maintained while the connection between the target RB and the source cell is established. In other words, if the connection between the target RB and the target cell has not been previously established, the connection between the target RB and both the source cell and the target cell may be simultaneously established. For example, a PDCP of a DRB simultaneously establishes RLC entities of the source cell and the target cell, where one RLC entity corresponds to a MAC entity of the source cell, and one RLC entity corresponds to a MAC entity of the target cell. If the connection between the target RB and the target cell is previously established, the connection between the target RB and the target cell may be maintained while the connection between the target RB and the source cell is established.

Further, in an optional embodiment, the processing of the target RB based on a state of the connection failure further includes one of the following:

processing, by using only a first parameter, data transmitted by a PDCP entity corresponding to the target RB; and storing the first parameter and a second parameter, and processing, by using the first parameter, data that is of the connection to the source cell and that is transmitted by the PDCP entity corresponding to the target RB; or storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or storing only the first parameter, and processing, by using the first parameter, data that is of the connection to the source cell and that is transmitted by the PDCP entity corresponding to the target RB, where the first parameter includes at least one of a key and a compression algorithm corresponding to the connection to the source cell, and the second parameter includes at least one of a key and a compression algorithm corresponding to the connection to the target cell.

In this embodiment of the present disclosure, in a case that the connection failure of the target cell occurs and the connection failure of the source cell does not occur, if the target RB is connected to the source cell and the target cell at the same time, the PDCP entity of the target RB may process received and sent data by using only the key and/or the compression algorithm corresponding to the connection to the source cell. The PDCP entity of the target RB may alternatively store the key and/or the compression algorithm corresponding to the connection to the source cell and simultaneously store the key and/or the compression algorithm corresponding to the connection to the target cell, but process received and sent data of the connection to the source cell by using only the key and/or the compression algorithm corresponding to the connection to the source cell. The PDCP entity of the target RB may alternatively store the first parameter and the second parameter, process, by using the first parameter, the data that is of the connection to the source cell and that is transmitted by the PDCP entity corresponding to the target RB, and process, by using the second parameter, the data that is of the connection to the target cell and that is transmitted by the PDCP entity corresponding to the target RB. The PDCP entity of the target RB may alternatively store only the key and/or the compression algorithm corresponding to the connection to the source cell, and process received and sent data of the connection to the source cell by using the key and/or the compression algorithm corresponding to the connection to the source cell.

Further, in an optional embodiment, the processing of the target RB based on a state of the connection failure further includes:

stopping sending and/or receiving data that is of the connection to the target cell and that is corresponding to the PDCP entity.

In this embodiment of the present disclosure, in a case that the connection failure of the target cell occurs and the connection failure of the source cell does not occur, if the target RB is connected to both the source cell and the target cell, the terminal may further stop sending and/or receiving the data that is of the connection to the target cell and that is corresponding to the PDCP entity.

In some embodiments, in an optional embodiment, establishing the connection between the target RB and the source cell based on preset target configuration information or target configuration information stipulated in a protocol includes:

configuring the PDCP entity corresponding to the target RB based on the target configuration information.

In this embodiment of the present disclosure, in a case that the connection failure of the target cell occurs and the connection failure of the source cell does not occur, if only the connection between the target RB and the source cell is established, the target configuration information may be used to re-establish or reconfigure the PDCP entity corresponding to the target RB or restore data. For example, a PDCP sending entity of the target RB retransmits, in the connection to the source cell, data that is not successfully sent in the connection to the target cell; or a PDCP receiving entity of the target RB sends receiving state information of a data packet to the source cell. The receiving state information of the data packet may include indication information of a number of a received data packet and a number of a data packet that is not received.

It should be understood that, that a PDCP receiving entity of the target RB sends receiving state information of a data packet to the source cell may be understood as that the PDCP receiving entity of the target RB sends the receiving state information of the data packet to a source access device of the source cell.

Further, in an optional embodiment, in a case that the connection failure of the target cell occurs and the connection failure of the source cell does not occur, the processing of the target RB based on a state of the connection failure further includes:

releasing an RLC entity that is connected to the target cell and that is corresponding to the target RB.

In this embodiment of the present disclosure, because the RLC entity that is connected to the target cell and that is corresponding to the target RB is released, memory occupation of the terminal can be effectively reduced, thereby improving a running speed of the terminal.

Further, in an optional embodiment, before the releasing an RLC entity that is connected to the target cell and that is corresponding to the target RB, the processing the target RB based on a state of the connection failure further includes:

re-establishing an RLC entity that is connected to the target cell and that is corresponding to the target RB.

In this embodiment of the present disclosure, because the RLC entity that is connected to the target cell and that is corresponding to the target RB is re-established before the RLC entity that is connected to the target cell and that is corresponding to the target RB is released, data in the RLC entity that is connected to the target cell and that is corresponding to the target RB may be retained, to prevent the data from being lost.

To better understand the present disclosure, a specific implementation process of the present disclosure is described in detail below.

Step 1: A terminal receives a DAPS mobility configuration (for example, a handover configuration or an SCG change configuration), where the DAPS mobility configuration includes one or more target RBs (for example, a DRB and/or an SRB) for which a DAPS function is not configured.

Step 2: In a DAPS mobility process, if a connection failure occurs, a processing behavior on a target RB for which the DAPS function is not configured includes any one of the following:

If a connection failure of a target cell occurs (or both a connection failure of a source cell and a connection failure of a target cell occur, or only a connection failure of a source cell occurs), the terminal deletes the target RB (for example, delete an RLC entity and a PDCP entity corresponding to the target RB). In addition, the terminal re-establishes the RLC entity before deleting the RLC entity. In addition, the terminal re-establishes the PDCP entity before deleting the PDCP entity.

If a connection failure of a target cell occurs (or both a connection failure of a source cell and a connection failure of a target cell occur), the terminal stops sending and/or receiving data of the target RB. It should be understood that when both sending and receiving the data of the target RB are stopped, it can be understood that the target RB is suspended.

If a connection failure of a target cell occurs and a connection to a source cell is still available, the terminal resumes receiving and/or sending data of the target RB (or referred to as resuming the target RB) by using the connection to the source cell.

If a connection failure of a source cell occurs and a connection to a target cell is still available, the terminal maintains receiving and/or sending data of the connection to the target cell on the target RB.

If the target RB is a DRB, the stopping or suspending a first operation of the target RB may include at least one of the following:
  a Packet Data Convergence Protocol (PDCP) of the DRB stops sending data to RLC;
  the PDCP of the DRB stops receiving data from RLC;
  RLC of the DRB stops sending data to MAC; and
  RLC of the DRB stops receiving data from MAC.

In some embodiments, that the PDCP of the DRB stops receiving data from RLC may include one of the following:
  the PDCP of the DRB stops receiving the data from RLC; and
  the PDCP of the DRB stops submitting the data from RLC to a higher layer.

That the PDCP of the DRB stops submitting the data from RLC to a higher layer may be understood as: although the PDCP of the DRB receives the data from RLC, but does not submit the received data to the higher layer (for example, a Service Discovery Application Profile (SDAP) or an Internet Protocol (IP)).

A case that the connection failure of the target cell occurs may include at least one of the following:
  a handover failure (for example, a handover fails within a specified time (for example, timer t304 timeout));
  an SCG change failure (for example, access of a new SCG is not completed within a specified time (for example, timer t307 timeout)); and
  an RLF.

The RLF may include the following several cases:
  out of synchronization at a physical layer (for example, timer t310 timeout);
  a random access failure at a MAC layer (for example, a maximum quantity of random access attempts is reached);
  an indication of a maximum quantity of retransmission times at an RLC layer (for example, the maximum quantity of retransmission times at the RLC layer is reached);
  a beam failure (for example, a beam recovery process failure); and
  an LBT failure (for example, a sending failure because uplink sending cannot be continuously performed on an unlicensed band due to frequency congestion).

A case that the connection failure of the source cell occurs may include at least one of the following:
  out of synchronization at a physical layer (for example, timer t310 timeout of a Primary Cell (PCell) connected to the source cell);
  a random access failure at a MAC layer (for example, a maximum quantity of random access attempts is reached at MAC connected to the source cell);
  an indication of a maximum quantity of retransmission times at an RLC layer (for example, the maximum quantity of retransmission times at the RLC layer is reached at RLC connected to the source cell);
  a beam failure (for example, a beam recovery process failure of the connection to the source cell); and
  an uplink LBT failure (for example, a sending failure because uplink sending cannot be continuously performed on an unlicensed band due to frequency congestion, where the connection to the source cell is the unlicensed band).

In the processing behavior of step 2, a method for the terminal to resume receiving and/or sending data of the target RB by using the connection to the source cell may be: the terminal resumes receiving and/or sending the data of the target RB by using target configuration information, where the target configuration information may be understood as configuration information that is for the connection to the source cell of the target RB and that is preconfigured or stipulated in a protocol, and may specifically include any one of the following:
  configuration information of the connection to the source cell of the target RB before the DAPS mobility configuration is received or executed, for example, configuration information of a source cell corresponding to a DRB before the terminal receives or executes a handover command, where the configuration information may include configuration information of RLC and a PDCP of the source cell corresponding to the DRB; and
  configuration information that is carried in the DAPS mobility configuration and that is used to resume the connection to the source cell of the target RB, for example, configuration information that is for the connection to the source cell of the DRB used in a case that the connection failure of the target cell occurs and that is received by the terminal in a DAPS handover command, where the configuration information may include configuration information of RLC and a PDCP of the source cell corresponding to the DRB.

In the processing behavior of step 2, when receiving data and/or sending of the target RB is resumed by using the connection to the source cell, the processing behavior of the target RB may include any one of the following methods:

Method 1: The connection to the target cell is established or maintained while the connection to the source cell is established. For example, a PDCP of a DRB simultaneously constructs RLC entities between a source cell and a target cell, where one RLC entity corresponds to a MAC entity of the source cell and one RLC entity corresponds to a MAC entity of the target cell.

Method 2: Only the connection to the source cell is established. For example, a PDCP and RLC of a DRB are configured to be connected to the source cell. The PDCP entity of the DRB processes received and sent data by using only a key and/or a compression algorithm corresponding to the connection to the source cell.

Further, that the terminal processes the target RB based on a state of the connection failure in the method 1 further includes one of the following:

The PDCP entity of the target RB processes received and sent data by using only a key and/or a compression algorithm corresponding to the connection to the source cell.

The PDCP entity of the target RB stores a key and/or a compression algorithm corresponding to the connection to the source cell and simultaneously stores a key and/or a compression algorithm corresponding to the connection to the target cell, but processes received and sent data of the connection to the source cell by using the key and/or the compression algorithm corresponding to the connection to the source cell.

The PDCP entity of the target RB stores a key and/or a compression algorithm corresponding to the connection to the source cell and simultaneously stores a key and/or a compression algorithm corresponding to the connection to the target cell; and processes received and sent data of the connection to the source cell by using the key and/or the compression algorithm corresponding to the connection to the source cell, and processes received and sent data of the connection to the target cell by using the key and/or the compression algorithm corresponding to the connection to the target cell.

The PDCP entity of the target RB stores only a key and/or a compression algorithm corresponding to the connection to the source cell, and processes received and sent data of the connection to the source cell by using the key and/or the compression algorithm corresponding to the connection to the source cell.

In some embodiments, that the terminal processes the target RB based on a state of the connection failure in the method 1 further includes: the terminal stops sending and/or receiving data that is of the connection to the target cell and that is corresponding to the target RB.

That the terminal processes the target RB based on a state of the connection failure in the method 2 further includes one of the following:

The PDCP entity of the target RB is re-established or reconfigured or data is restored by using the configuration information of the connection to the source cell of the target RB. For example, a PDCP sending entity of the target RB retransmits, in the connection to the source cell, data that is not successfully sent in the connection to the target cell; or a PDCP receiving entity of the target RB sends receiving state information of a data packet to a source access device of the source cell. The receiving state information of the data packet may include indication information of a number of a received data packet and a number of a data packet that is not received.

In some embodiments, that the terminal processes the target RB based on a state of the connection failure in the method 2 further includes: releasing an RLC entity connected to the target cell. In addition, the terminal re-establishes the RLC entity before releasing the RLC entity connected to the target cell.

Figure 3:
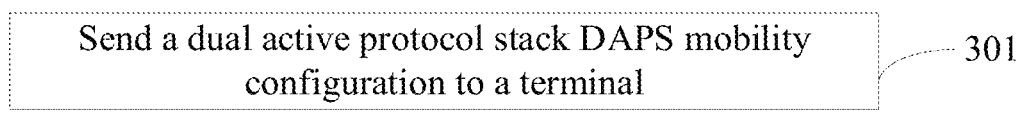
FIG. 3 is a flowchart of another connection failure processing method according to an embodiment of the present disclosure.

Referring to FIG. 3, FIG. 3 is a flowchart of another connection failure processing method according to an embodiment of the present disclosure. The method is applied to a network device, and the network device is a source access device that performs a DAPS mobility process with a terminal. As shown in FIG. 3, the method includes the following steps:

Step 301: Send a dual active protocol stack DAPS mobility configuration to the terminal.

The DAPS mobility configuration includes a target radio bearer RB for which a DAPS function is not configured; the DAPS mobility configuration is used by the terminal to perform the DAPS mobility process, and in the DAPS mobility process, in a case that a connection failure occurs, process the target RB based on a state of the connection failure; and the state of the connection failure includes at least one of occurrence of a connection failure of a source cell and occurrence of a connection failure of a target cell.

In some embodiments, the method further includes:
sending first configuration information to the terminal, where the first configuration information is used to establish a connection between the target RB and the source cell.

In some embodiments, the DAPS mobility configuration carries second configuration information, the second configuration information is configuration information that is for a connection to the source cell and that is used to resume a second operation, and the second operation includes data sending and/or receiving of the target RB.

In some embodiments, after a connection between the target RB and the source cell is established, the method further includes:
processing, by using only a first parameter, data transmitted by a PDCP entity corresponding to the target RB; and
storing the first parameter and a second parameter, and processing, by using the first parameter, data that is of the connection to the source cell and that is transmitted by the PDCP entity corresponding to the target RB; or
storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or
storing only the first parameter, and processing, by using the first parameter, data that is of the connection to the source cell and that is transmitted by the PDCP entity corresponding to the target RB, where
the first parameter includes at least one of a key and a compression algorithm corresponding to the connection to the source cell, and the second parameter includes at least one of a key and a compression algorithm corresponding to the connection to the target cell.

It should be noted that this embodiment is used as an implementation of the network device corresponding to the embodiment shown in FIG. 2. For a specific implementation of this embodiment, refer to the related descriptions of the embodiment shown in FIG. 2. A same beneficial effect can also be achieved. To avoid repeated descriptions, details are not described again herein.

Figure 4:
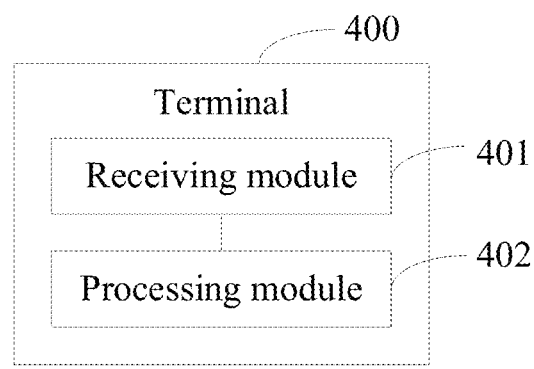
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, a terminal 400 includes:

a receiving module 401, configured to receive a dual active protocol stack DAPS mobility configuration sent by a network device, where the DAPS mobility configuration includes a target radio bearer RB for which a DAPS function is not configured; and a processing module 402, configured to: in a DAPS mobility process, in a case that a connection failure occurs, process the target RB based on a state of the connection failure, where the state of the connection failure includes at least one occurrence of a connection failure of a source cell and occurrence of a connection failure of a target cell.

In some embodiments, the processing module 402 is specifically configured to perform any one of the following operations:

deleting the target RB in a case that the connection failure of the target cell occurs; and stopping or suspending a first operation of the target RB in a case that the connection failure of the target cell occurs, where the first operation includes data sending and/or receiving; or stopping or suspending a first operation of the target RB in a case that the connection failure of the target cell occurs and the connection failure of the source cell does not occur, where the first operation includes data sending and/or receiving; or establishing a connection between the target RB and the source cell in a case that the connection failure of the target cell occurs and the connection failure of the source cell does not occur, to resume a second operation of the target RB, where the second operation includes data sending and/or receiving; or maintaining data sending and/or receiving of the target RB in the target cell in a case that the connection failure of the source cell occurs and the connection failure of the target cell does not occur.

In some embodiments, the processing module 402 is specifically configured to delete a radio link control RLC entity and a packet data convergence protocol PDCP entity corresponding to the target RB.

In some embodiments, the processing module 402 is further configured to re-establish the RLC entity corresponding to the target RB.

In some embodiments, the processing module 402 is further configured to re-establish the PDCP entity corresponding to the target RB.

In some embodiments, the processing module 402 is further configured to establish the connection between the target RB and the source cell based on preset target configuration information or target configuration information stipulated in a protocol.

In some embodiments, the target configuration information includes first configuration information for the target RB to establish the connection to the source cell before the DAPS mobility configuration is received or executed, or second configuration information carried in the DAPS mobility configuration, where the second configuration information is configuration information that is for the connection to the source cell and that is used to resume the second operation of the target RB.

In some embodiments, in a case that the connection failure of the target cell occurs and the connection failure of the source cell does not occur, the processing module 402 is further configured to establish or maintain a connection between the target RB and the target cell.

In some embodiments, the processing module 402 is further configured to perform one of the following:

processing, by using only a first parameter, data transmitted by a PDCP entity corresponding to the target RB; and storing the first parameter and a second parameter, and processing, by using the first parameter, data that is of the connection to the source cell and that is transmitted by the PDCP entity corresponding to the target RB; or storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or storing only the first parameter, and processing, by using the first parameter, data that is of the connection to the source cell and that is transmitted by the PDCP entity corresponding to the target RB, where the first parameter includes at least one of a key and a compression algorithm corresponding to the connection to the source cell, and the second parameter includes at least one of a key and a compression algorithm corresponding to the connection to the target cell.

In some embodiments, the processing module 402 is further configured to stop sending and/or receiving data that is of the connection to the target cell and that is corresponding to the PDCP entity.

In some embodiments, the processing module 402 is specifically configured to configure the PDCP entity corresponding to the target RB based on the target configuration information.

In some embodiments, in a case that the connection failure of the target cell occurs and the connection failure of the source cell does not occur, the processing module 402 is further configured to release an RLC entity that is connected to the target cell and that is corresponding to the target RB.

In some embodiments, the processing module 402 is further configured to re-establish an RLC entity that is connected to the target cell and that is corresponding to the target RB.

The terminal provided in this embodiment of the present disclosure can implement the processes implemented by the terminal in the method embodiment in FIG. 2. To avoid repetition, details are not described herein again.

Figure 5:
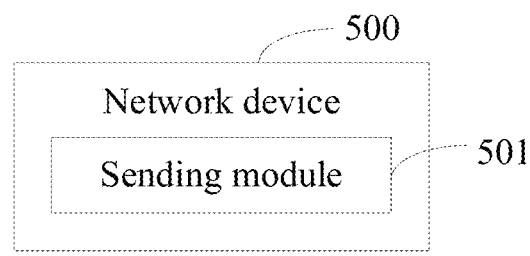
FIG. 5 is a structural diagram of a network device according to an embodiment of the present disclosure.

Referring to FIG. 5, FIG. 5 is a structural diagram of a network device according to an embodiment of the present disclosure. The network device is a source access device that performs a DAPS mobility process with a terminal. As shown in FIG. 5, a network device 500 includes:

a sending module 501, configured to send a dual active protocol stack DAPS mobility configuration to the terminal, where the DAPS mobility configuration includes a target radio bearer RB for which a DAPS function is not configured; the DAPS mobility configuration is used by the terminal to perform the DAPS mobility process, and in the DAPS mobility process, in a case that a connection failure occurs, process the target RB based on a state of the connection failure occurs; and the state of the connection failure includes at least one of occurrence of a connection failure of a source cell and occurrence of a connection failure of a target cell.

In some embodiments, the sending module 501 is further configured to send first configuration information to the terminal, where the first configuration information is used to establish a connection between the target RB and the source cell.

In some embodiments, the DAPS mobility configuration carries second configuration information, the second configuration information is configuration information that is for a connection to the source cell and that is used to resume a second operation, and the second operation includes data sending and/or receiving of the target RB.

In some embodiments, after the connection between the target RB and the source cell is established, the network device 500 further includes a processing module, and the processing module performs any one of the following operations:

processing, by using only a first parameter, data transmitted by a PDCP entity corresponding to the target RB; and storing the first parameter and a second parameter, and processing, by using the first parameter, data that is of the connection to the source cell and that is transmitted by the PDCP entity corresponding to the target RB; or storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or storing only the first parameter, and processing, by using the first parameter, data that is of the connection to the source cell and that is transmitted by the PDCP entity corresponding to the target RB, where the first parameter includes at least one of a key and a compression algorithm corresponding to the connection to the source cell, and the second parameter includes at least one of a key and a compression algorithm corresponding to the connection to the target cell.

The network device provided in this embodiment of the present disclosure can implement the processes implemented by the network device in the method embodiment in FIG. 3. To avoid repetition, details are not described herein again.

Figure 6:
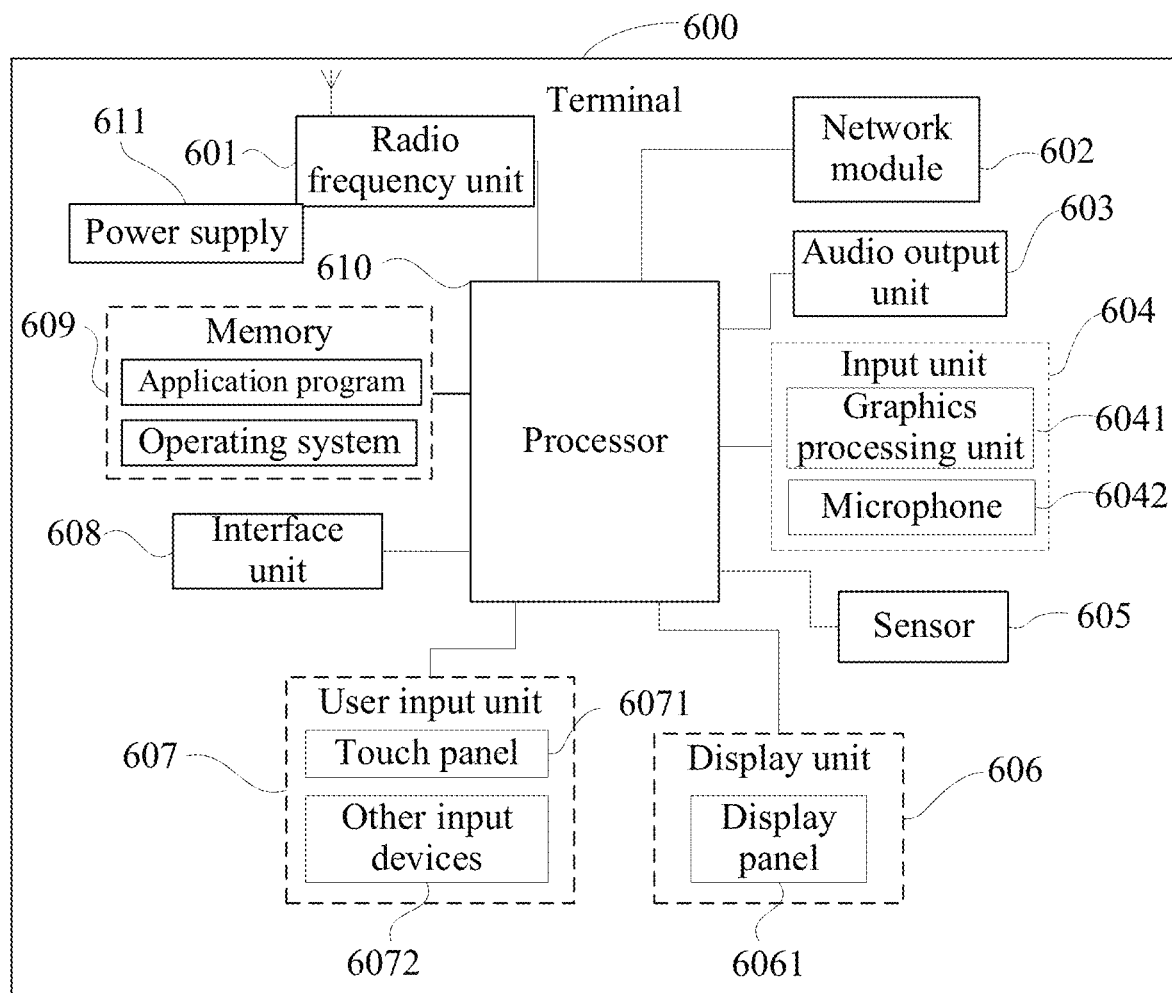
FIG. 6 is a structural diagram of another terminal according to an embodiment of the present disclosure.

FIG. 6 is a schematic diagram of a hardware structure of a terminal according to the embodiments of the present disclosure. A terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 601 is configured to receive a dual active protocol stack DAPS mobility configuration sent by a network device, where the DAPS mobility configuration includes a target radio bearer RB for which a DAPS function is not configured; and the processor 610 is configured to: in a DAPS mobility process, in a case that a connection failure occurs, process the target RB based on a state of the connection failure, where the state of the connection failure includes at least one of occurrence of a connection failure of a source cell and occurrence of a connection failure of a target cell.

It should be understood that, in this embodiment, the processor 610 and the radio frequency unit 601 can implement the processes implemented by the terminal in the method embodiment in FIG. 2. To avoid repetition, details are not described herein again.

It should be understood that, in this embodiment of the present disclosure, the radio frequency unit 601 may be configured to receive and send information or transmit a signal in a call process. Specifically, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may communicate with a network and another device through a wireless communication system.

The terminal provides wireless broadband Internet access for the user by using the network module 602, for example, helping the user to send and receive an e-mail, browse a web page, and access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal received voice, or a message received voice) related to a specific function implemented by the terminal 600. The audio output unit 603 includes a speaker, a buzzer, a telephone receiver, and the like.

The input unit 604 is configured to receive an audio signal or a video signal. The input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. Processed audio data may be converted, in a call mode, into a format that can be sent to a mobile communication base station by using the radio frequency unit 601 for output.

The terminal 600 further includes at least one type of sensor 605, such as a light sensor, a motion sensor, and another sensor. Specifically, the light sensor includes an ambient light sensor and a proximity sensor. The ambient light sensor may adjust the luminance of the display panel

6061 based on the brightness of ambient light. The proximity sensor may turn off the display panel 6061 and/or backlight when the terminal 600 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include a display panel 6061. The display panel 6061 may be configured in a form of a Liquid Crystal Display (LCD), an Organic Light-Emitting Diode (OLED), or the like.

The user input unit 607 may be configured to receive input numeral or character information, and generate key signal input related to user setting and functional control of the terminal. Specifically, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 610, and can receive and execute a command sent by the processor 610. In addition, the touch panel 6071 may be of a resistive type, a capacitive type, an infrared type, a surface acoustic wave type, or the like. The user input unit 607 may include another input device 6072 in addition to the touch panel 6071. Specifically, the another input device 6072 may include but is not limited to a physical keyboard, a functional button (such as a volume control button or a power on/off button), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides a corresponding visual output on the display panel 6061 based on the type of the touch event. In FIG. 6, although the touch panel 6071 and the display panel 6061 are used as two independent parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus with the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 608 may be configured to receive input (for example, data information and power) from an external apparatus and transmit the received input to one or more elements in the terminal 600 or may be configured to transmit data between the terminal 600 and an external apparatus.

The memory 609 may be configured to store a software program and various data. The memory 609 may mainly include a program storage area and a data storage area. The program storage area may store an operating system, an application program required by at least one function (such as a sound play function or an image play function), and the like. The data storage area may store data (such as audio data or an address book) created based on the use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal, and connects all parts of the entire terminal by using various interfaces and lines. By running or executing a software program and/or a module stored in the memory 609 and invoking data stored in the memory 609, the processor 610 performs various functions of the terminal and data processing, to perform overall monitoring on the terminal. The processor 610 may include one or more processing units. For example, an application processor and a modem processor may be integrated into the processor 610. The application processor mainly processes an operating system, a user interface, an application program, and the like. The modem processor mainly processes wireless communications. It can be understood that, alternatively, the modem processor may not be integrated into the processor 610.

The terminal 600 may further include the power supply 611 (such as a battery) that supplies power to each component. For example, the power supply 611 may be logically connected to the processor 610 by using a power management system, so as to implement functions such as charging, discharging, and power consumption management by using the power management system.

In addition, the terminal 600 includes some function modules not shown, and details are not described herein.

For example, an embodiment of the present disclosure further provides a terminal, including a processor 610, a memory 609, and a computer program that is stored in the memory 609 and that can be run on the processor 610. When the computer program is executed by the processor 610, the processes of the foregoing connection failure processing method embodiment on the terminal side are implemented and a same technical effect can be achieved. To avoid repetition, details are not described herein again.

Figure 7:
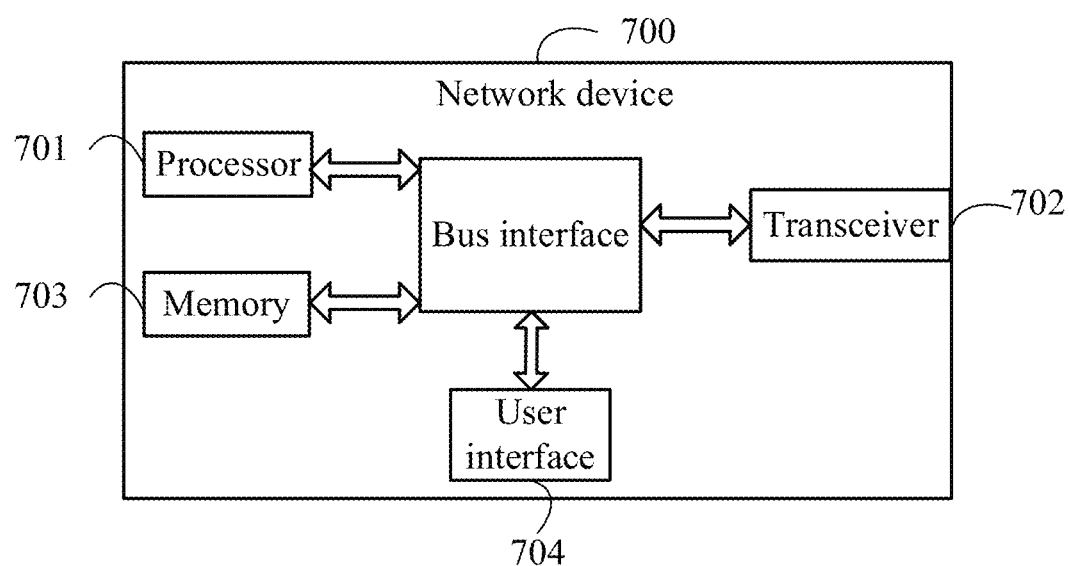
FIG. 7 is a structural diagram of another network device according to an embodiment of the present disclosure.

Referring to FIG. 7, FIG. 7 is a structural diagram of another network device according to an embodiment of the present disclosure. The network device is a source access device that performs a DAPS mobility process with a terminal. As shown in FIG. 7, a network device 700 includes a processor 701, a transceiver 702, a memory 703, and a bus interface.

The transceiver 702 is configured to send a dual active protocol stack DAPS mobility configuration to the terminal, where the DAPS mobility configuration includes a target radio bearer RB for which a DAPS function is not configured; the DAPS mobility configuration is used by the terminal to perform the DAPS mobility process, and in the DAPS mobility process, in a case that a connection failure occurs, process the target RB based on a state of the connection failure; and the state of the connection failure includes at least one of occurrence of a connection failure of a source cell and occurrence of a connection failure of a target cell.

It should be understood that, in this embodiment, the processor 701 and the transceiver 702 can implement the processes implemented by the network device in the method embodiment in FIG. 3. To avoid repetition, details are not described herein again.

In FIG. 7, a bus architecture may include any quantity of interconnected buses and bridges. Specifically, various circuits of one or more processors represented by the processor 701 and a memory represented by the memory 703 are interconnected. The bus architecture may further link various other circuits such as a peripheral device, a voltage regulator, and a power management circuit. These are well known in the art, and therefore are not further described in this specification. A bus interface provides an interface. The transceiver 702 may be a plurality of components. To be specific, the transceiver 702 includes a transmitter and a receiver, and provides a unit configured to communicate with various other apparatuses on a transmission medium. For different user equipment, a user interface 704 may be an interface that can externally or internally connect to a needed device, and the connected device includes but is not limited to a keypad, a display, a loudspeaker, a microphone, and a joystick.

The processor 701 is responsible for bus architecture management and general processing. The memory 703 may store data used by the processor 701 when the processor 701 performs an operation.

For example, an embodiment of the present disclosure further provides a network device, including a processor 701, a memory 703, and a computer program that is stored in the memory 703 and that can be run on the processor 701. When the computer program is executed by the processor 701, the processes of the foregoing connection failure processing method embodiment on the network device side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the steps of the connection failure processing method on the terminal side provided in the embodiments of the present disclosure are implemented, or when the computer program is executed by a processor, the steps of the connection failure processing method on the network device side provided in the embodiments of the present disclosure are implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a base station, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method of connection failure processing, performed by a terminal, comprising:
   receiving a Dual Active Protocol Stack (DAPS) mobility configuration sent by a network device, wherein the DAPS mobility configuration comprises a target Radio Bearer (RB) for which a DAPS function is not configured; and
   in a DAPS mobility process, when a connection failure occurs, processing the target RB based on a state of the connection failure,
   wherein the state of the connection failure comprises an occurrence of a connection failure of a target cell,
   wherein the processing the target RB based on a state of the connection failure comprises:
   establishing a connection between the target RB and a source cell when the connection failure of the target cell occurs and the connection failure of the source cell does not occur, to resume a second operation of the target RB, wherein the second operation comprises data sending or receiving.

2. The method according to claim 1, wherein the state of the connection failure further comprises a connection failure of a source cell; wherein the processing the target RB based on a state of the connection failure further comprises one of the following:
   deleting the target RB when the connection failure of the target cell occurs; and
   stopping or suspending a first operation of the target RB when the connection failure of the target cell occurs, wherein the first operation comprises data sending or receiving; or
   stopping or suspending a first operation of the target RB when the connection failure of the target cell occurs and the connection failure of the source cell does not occur, wherein the first operation comprises data sending or receiving; or maintaining data sending or receiving of the target RB in the target cell when the connection failure of the source cell occurs and the connection failure of the target cell does not occur.

3. The method according to claim 2, wherein the deleting the target RB comprises deleting a Radio Link Control (RLC) entity and a Packet Data Convergence Protocol (PDCP) entity corresponding to the target RB.

4. The method according to claim 3, wherein before the deleting an RLC entity corresponding to the target RB, the processing the target RB based on a state of the connection failure further comprises:
re-establishing the RLC entity corresponding to the target RB.

5. The method according to claim 3, wherein before the deleting a PDCP entity corresponding to the target RB, the processing the target RB based on a state of the connection failure further comprises:
re-establishing the PDCP entity corresponding to the target RB.

6. The method according to claim 1, wherein the establishing the connection between the target RB and the source cell comprises:
establishing the connection between the target RB and the source cell based on preset target configuration information or target configuration information stipulated in a protocol.

7. The method according to claim 6, wherein the target configuration information comprises first configuration information for the target RB to establish the connection to the source cell before the DAPS mobility configuration is received or executed, or second configuration information carried in the DAPS mobility configuration, wherein the second configuration information is configuration information that is for the connection to the source cell and that is used to resume the second operation of the target RB.

8. The method according to claim 6, wherein the establishing the connection between the target RB and the source cell based on preset target configuration information or target configuration information stipulated in a protocol comprises:
configuring the PDCP entity corresponding to the target RB based on the target configuration information.

9. The method according to claim 8, wherein before the releasing an RLC entity that is connected to the target cell and that is corresponding to the target RB, the processing the target RB based on a state of the connection failure further comprises:
re-establishing an RLC entity that is connected to the target cell and that is corresponding to the target RB.

10. The method according to claim 1, wherein when the connection failure of the target cell occurs and the connection failure of the source cell does not occur, the processing the target RB based on a state of the connection failure further comprises:
establishing or maintaining a connection between the target RB and the target cell.

11. The method according to claim 10, wherein the processing the target RB based on a state of the connection failure further comprises one of the following:
processing, by using only a first parameter, data transmitted by a PDCP entity corresponding to the target RB; and
storing the first parameter and a second parameter, and processing, by using the first parameter, data that is of the connection to the source cell and that is transmitted by the PDCP entity corresponding to the target RB; or storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or
storing only the first parameter, and processing, by using the first parameter, data that is of the connection to the source cell and that is transmitted by the PDCP entity corresponding to the target RB,
wherein the first parameter comprises at least one of a key or a compression algorithm corresponding to the connection to the source cell, and the second parameter comprises at least one of a key or a compression algorithm corresponding to the connection to the target cell.

12. The method according to claim 11, wherein the processing the target RB based on a state of the connection failure further comprises:
stopping sending or receiving data that is of the connection to the target cell and that is corresponding to the PDCP entity.

13. The method according to claim 1, wherein when the connection failure of the target cell occurs and the connection failure of the source cell does not occur, the processing the target RB based on a state of the connection failure further comprises:
releasing an RLC entity that is connected to the target cell and that is corresponding to the target RB.

14. The method according to claim 1, wherein the target RB is a Data Radio Bearer (DRB), the establishing the connection between the target RB and the source cell when the connection failure of the target cell occurs and the connection failure of the source cell does not occur, to resume a second operation of the target RB comprises:
only establishing a connection between the DRB and the source cell when the connection failure of the target cell occurs and the connection failure of the source cell does not occur;
connecting a PDCP and RLC of the DRB to the source cell, and
the processing the target RB based on a state of the connection failure further comprises:
processing, by a PDCP entity of the target RB, received and sent data of a connection to the source cell by using a key or a compression algorithm corresponding to the connection to the source cell.

15. A method of connection failure processing, performed by a network device, wherein the network device is a source access device that performs a Dual Active Protocol Stack (DAPS) mobility process with a terminal, and the method comprises:
sending a DAPS mobility configuration to the terminal, wherein the DAPS mobility configuration comprises a target Radio Bearer (RB) for which a DAPS function is not configured; the DAPS mobility configuration is used by the terminal to perform the DAPS mobility process, and in the DAPS mobility process, when a connection failure occurs, the terminal processes the target RB based on a state of the connection failure; and the state of the connection failure comprises an occurrence of a connection failure of a target cell,
wherein the terminal processes the target RB based on a state of the connection failure comprises:

establishing a connection between the target RB and a source cell when the connection failure of the target cell occurs and the connection failure of the source cell does not occur, to resume a second operation of the target RB, wherein the second operation comprises data sending or receiving.

16. The method according to claim 15, further comprising:

sending first configuration information to the terminal, wherein the first configuration information is used to establish a connection between the target RB and the source cell.

17. The method according to claim 15, wherein the DAPS mobility configuration carries second configuration information, the second configuration information is configuration information that is for the connection to the source cell and that is used to resume the second operation, and the second operation comprises data sending or receiving of the target RB.

18. The method according to claim 15, wherein after the connection between the target RB and the source cell is established, the method further comprises:

processing, by using only a first parameter, data transmitted by a Packet Data Convergence Protocol (PDCP) entity corresponding to the target RB; and storing the first parameter and a second parameter, and processing, by using the first parameter, data that is of the connection to the source cell and that is transmitted by the PDCP entity corresponding to the target RB; or storing the first parameter and a second parameter, processing, by using the first parameter, data that is of the connection to the source cell and that is transmitted by the PDCP entity corresponding to the target RB, and processing, by using the second parameter, data that is of the connection to the target cell and that is transmitted by the PDCP entity corresponding to the target RB; or storing only the first parameter, and processing, by using the first parameter, data that is of the connection to the source cell and that is transmitted by the PDCP entity corresponding to the target RB, wherein the first parameter comprises at least one of a key or a compression algorithm corresponding to the connection to the source cell, and the second parameter comprises at least one of a key or a compression algorithm corresponding to the connection to the target cell.

19. A terminal, comprising: a memory storing a computer program; and a processor coupled to the memory and configured to execute the computer program to perform a method of connection failure processing, the method comprising:

receiving a Dual Active Protocol Stack (DAPS) mobility configuration sent by a network device, wherein the DAPS mobility configuration comprises a target Radio Bearer (RB) for which a DAPS function is not configured; and in a DAPS mobility process, when a connection failure occurs, processing the target RB based on a state of the connection failure, wherein the state of the connection failure comprises an occurrence of a connection failure of a target cell, wherein the processing the target RB based on a state of the connection failure comprises:

establishing a connection between the target RB and a source cell when the connection failure of the target cell occurs and the connection failure of the source cell does not occur, to resume a second operation of the target RB, wherein the second operation comprises data sending or receiving.

20. The terminal according to claim 19, wherein the state of the connection failure further comprises a connection failure of a source cell; wherein the processing the target RB based on a state of the connection failure further comprises one of the following:

deleting the target RB when the connection failure of the target cell occurs; and stopping or suspending a first operation of the target RB when the connection failure of the target cell occurs, wherein the first operation comprises data sending or receiving; or stopping or suspending a first operation of the target RB when the connection failure of the target cell occurs and the connection failure of the source cell does not occur, wherein the first operation comprises data sending or receiving; or maintaining data sending or receiving of the target RB in the target cell when the connection failure of the source cell occurs and the connection failure of the target cell does not occur.

21. The terminal according to claim 20, wherein the deleting the target RB comprises deleting a Radio Link Control (RLC) entity and a Packet Data Convergence Protocol (PDCP) entity corresponding to the target RB.

* * * * *